United States Patent

Kiyono et al.

Patent Number: 6,137,483
Date of Patent: *Oct. 24, 2000

[54] MULTIMEDIA EDITING METHOD USING TEMPLATES DESCRIBING COMMON LOGIC STRUCTURE, LAYOUT, AND PHYSICAL OPERATION

[75] Inventors: Masaki Kiyono, Kanagawa; Koji Hatano; Sachiko Uranaka, both of Tokyo; Yoshio Fukushige, Kanagawa; Hideko Kurita, Ibaraki, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/756,135

[22] Filed: Nov. 27, 1996

[30] Foreign Application Priority Data

Dec. 1, 1995 [JP] Japan .................................. 7-314473

[51] Int. Cl.[7] .......................... G06F 17/30; G06F 15/00; G06F 17/60
[52] U.S. Cl. ............................................. 345/302; 705/27
[58] Field of Search .............................. 345/302; 705/26, 705/27

[56] References Cited

U.S. PATENT DOCUMENTS

| | | | |
|---|---|---|---|
| 4,992,940 | 2/1991 | Dworkin | 705/26 |
| 5,278,946 | 1/1994 | Shimada et al. | 707/104 |
| 5,438,512 | 8/1995 | Mantha | 707/517 |

(List continued on next page.)

FOREIGN PATENT DOCUMENTS

| | | | |
|---|---|---|---|
| 5-101053 | 4/1993 | Japan . | |
| 5-108631 | 4/1993 | Japan . | |
| 5-334291 | 12/1993 | Japan . | |
| 6-243023 | 9/1994 | Japan . | |
| 8-166958 | 6/1996 | Japan .............................. G06F 17/30 |

OTHER PUBLICATIONS

Schloss, Gerhard et al. "Presentation Layer Primitives for the Layered Multimedia Data Model", Proceedings of the International Conference on Multimedia Computing and Systems, Institut of Electrical and Electrical Engineers Computer Society, pp. 231–238, May 1995.

Translation of Japanese Patent No. 8–166958, by Ralph McElroy Translation, Co., (Washington DC), pp. 1–20, Apr. 1999.

Anonymous, "MediaSahre (sic.) Has Interactive Electronic Catalogue System", Computergram International, 235 words, Jul. 1994.

Tsalgatidou, A. et al., A Multimedia Title Development Environment–MTDE', Information Processing & Management, v. 31, No. 1, pp. 101–112, Jan. 1995.

Wang, H. K., "Object Model for Hypermedia Applications", Computer Communications, v. 18, No. 7, pp. 475–485, Jul. 1995.

Primary Examiner—Mark R. Powell
Assistant Examiner—Jeffrey Allen Rossi
Attorney, Agent, or Firm—Pearne & Gordon LLP

[57] ABSTRACT

A multimedia editing apparatus including a template manager, a material information manager, a template operator, a logic structure synthesizer, a layout structure synthesizer, and a physical operation determiner. The template manager manages a template describing therein a logic structure, a layout structure, and a physical operation common to a diversity of multimedia content. The material information manager manages material information such as text, photo, and video. The template operator combines material information extracted from the material manager with a template extracted from the template manager. The logic structure synthesizer synthesizes a logic structure in a template with material information. The layout structure synthesizer synthesizes a layout structure in a template with material information. The physical operation determiner determines physical operations of material based on the synthesized logic structure which material information a physical operation in a template should use.

16 Claims, 8 Drawing Sheets

U.S. PATENT DOCUMENTS

| | | | |
|---|---|---|---|
| 5,440,678 | 8/1995 | Eisen et al. | 707/537 |
| 5,475,805 | 12/1995 | Murata | 707/513 |
| 5,555,362 | 9/1996 | Yamashita et al. | 707/517 |
| 5,600,771 | 2/1997 | Hayashi et al. | 707/517 |
| 5,608,859 | 3/1997 | Taguchi | 345/302 |
| 5,613,057 | 3/1997 | Caravel | 345/302 |
| 5,659,793 | 8/1997 | Escobar et al. | 345/302 |
| 5,675,752 | 10/1997 | Scott et al. | 345/302 |
| 5,680,619 | 10/1997 | Gudmundson et al. | 345/302 X |
| 5,708,825 | 1/1998 | Sotomayor | 707/501 |
| 5,740,425 | 4/1998 | Povilus | 705/27 |
| 5,848,291 | 12/1998 | Milne et al. | 345/302 |
| 5,864,338 | 1/1999 | Nestor et al. | 345/302 |
| 5,878,421 | 3/1999 | Ferrel et al. | 707/100 |
| 5,890,175 | 3/1999 | Wong et al. | 705/26 |

MULTIMEDIA EDITING METHOD USING TEMPLATES DESCRIBING COMMON LOGIC STRUCTURE, LAYOUT, AND PHYSICAL OPERATION

BACKGROUND OF THE INVENTION

The present invention relates to multimedia editing apparatuses, and more particularly to a multimedia editing apparatus that is adapted for relatively highly regular information content and that creates content efficiently by registering regularity of such content as a template.

Conventional techniques related to the present invention are a multimedia editing technique and a document processing technique. Multimedia content stored in CD-ROMs and Video-CDs have heretofore been created by following the procedure for designing a layout structure and a physical operation per title, preparing and selecting material information to be used, then loading the layout structure and the physical operation while arranging the material information in a display space using a so-called authoring tool, such as "DIRECTOR" developed by MACROMEDIA Inc. of the United States. This procedure has been successful because it is originality that is important for individual multimedia content; i.e., the multimedia content are not common, and because such multimedia content will not be made twice.

Therefore, there are only a small number of examples of templates handling regularity in the preparation of multimedia content. For example, "SCENARIO EDITING APPARATUS" disclosed in Unexamined Japanese Patent Publication 6-243023 introduces an idea of template into the preparation of scenarios for multimedia applications. The template being discussed in this publication is not a model of the entire part of multimedia content, but is a template merely registering therein individual physical effects.

On the other hand, in the field of document processing, there has been a strong demand for the editing of structured documents that have common regularity. The "STRUCTURED DOCUMENT EDITING METHOD" disclosed in Unexamined Japanese Patent Publication 5-101053 proposes a method in which by specifying a specific portion of a "model structure" of a document, a new model structure is generated from the document prepared based on such model structure. Further, the "DOCUMENT PROCESSING APPARATUS" disclosed in Unexamined Japanese Patent Publication 5-108631 proposes an apparatus that directly edits on a display a logic structure of a document called a "common structure". Still further, the "DOCUMENT PROCESSING APPARATUS" disclosed in Unexamined Japanese Patent Publication 5-334291 proposes an apparatus that prepares a specific table of contents based on a "model" of a table of contents.

These document processing apparatuses share a common idea that not only the layout of a document is edited by a WYSIWYG type editing function but also a function for preparing individual documents from a logic structure of a document registered as a template is employed. Since a document is static unlike the multimedia content, regularity of a document is handled only by sharing the logic structure.

Conventional multimedia editing apparatuses do not have a means for handling regularity of the entire part of multimedia content to be edited. Therefore, the conventional multimedia editing apparatuses are not adapted to be used for repetitively preparing relatively highly regularity content such as an electronic catalog and an electronic teaching material. On the other hand, some conventional document processing apparatuses have a document preparing function based on a template as a means for handing document regularity. Since the multimedia content involve even physical operations unlike the document that is static, not dynamic, these document processing apparatuses cannot be applied directly to the editing of multimedia content. In addition, in the case of multimedia content, there is a strong demand for improving the attractiveness of content by giving various layouts and operations to a single logical structure. Therefore, an editing apparatus that can satisfy both regularity and diversification must be developed.

SUMMARY OF THE INVENTION

The object of the present invention is to overcome these problems and provide a multimedia editing apparatus that satisfies both regularity and diversification and that can prepare final content efficiently.

To achieve the above object, a multimedia editing apparatus of the present invention is characterized as adopting a system for generating individual content by combining a material with a template common to a diversity of multimedia content, and determining a layout and a physical operation of specific content only by combining either visually or logically material information such as texts, photos, and videos with a template by describing a logic structure, a layout structure, and a physical operation in a template.

Further, a multimedia editing apparatus of the present invention is characterized as preparing attractive multimedia content having a diversity of display modes and utilization modes from the same material information by using simultaneously a diversity of templates having a common logic structure, different layout structures, and different physical operations.

A multimedia editing apparatus of the present invention is characterized in that a template is prepared, the template describing therein a logic structure, a layout structure, and a physical operation of content as model information common to a diversity of multimedia content, and material information such as texts, photos, videos is combined with the template either visually or logically, so that a layout and a physical operation of specific multimedia content are determined. Therefore, the multimedia editing apparatus can prepare final content efficiently while satisfying both regularity and diversification.

A multimedia editing apparatus of the present invention is characterized as including: a template managing means for managing a template describing therein a logic structure, a layout structure, and a physical operation common to a diversity of multimedia content; a material managing means for managing material information such as texts, photos, videos; a template operating means for combining a template extracted from the template managing means with material information extracted from the material managing means; a logic structure synthesizing means for synthesizing a logic structure in a template with material information; a layout structure synthesizing means for synthesizing a layout structure in a template with material information; and a physical operation determining means for determining physical operations of materials based on a synthesized logic structure which material information a physical operation in a template should use. Therefore, the multimedia editing apparatus can create final content efficiently while satisfying both regularity and diversification.

A multimedia editing apparatus of the present invention is characterized in that the layout structure synthesizing means synthesizes a layout of specific content by combining material information with a layout structure in a template visually; and the logic structure synthesizing means synthesizes a logic structure of specific content by combining a logic structure in a template with material information based on a synthesized layout structure. Therefore, the multimedia editing apparatus can create final content efficiently while satisfying both regularity and diversification.

A multimedia editing apparatus of the present invention is characterized in that the logic structure synthesizing means synthesizes a logic structure of specific content by directly combining a logic structure in a template with material information; and the layout structure synthesizing means synthesizes a layout of specific content by combining a layout structure in a template with material information based on a synthesized logic structure. Therefore, the multimedia editing apparatus can create final content efficiently while satisfying both regularity and diversification.

A multimedia editing apparatus of the present invention is characterized as including: a restrictive condition checking means for checking whether material information extracted from the material managing means satisfies a restrictive condition described in a template and preventing the material from being combined when the material information does not satisfy the restrictive condition. Therefore, the multimedia editing apparatus can create final content efficiently while satisfying both regularity and diversification.

A multimedia editing apparatus of the present invention is characterized as including a material selecting means for searching only such material information as to satisfy a restrictive condition described in a template from the material managing means and selecting material information to be actually combined with the template from searched material information. Therefore, the multimedia editing apparatus can create final content efficiently while satisfying both regularity and diversification.

A multimedia editing apparatus of the present invention is characterized in that the material selecting means searches only such information as to satisfy a restrictive condition described in a template and as to have the same attribute as already used material information and selects material information to be actually combined with the template from searched material information. Therefore, the multimedia editing apparatus can create final content efficiently while satisfying both regularity and diversification.

A multimedia editing apparatus of the present invention is characterized in that the template operating means combines a diversity of templates simultaneously with the same material information, the diversity of templates having a common logic structure, different layout structures, and different physical operations. Therefore, the multimedia editing apparatus can create final content efficiently while satisfying both regularity and diversification.

A multimedia editing apparatus of the present invention is characterized in that the multimedia editing apparatus prepares an electronic catalog having a diversity of display modes and utilization modes by combining freely three types of templates, a first template being a searching type template in which a set of items is handled as a logic structure and an operation for searching an item satisfying a search condition from the set of items and displaying the searched item is described, a second template being a presenting type template in which an operation for interactively reproducing only a specific item is described, and a third template being a discovering type template in which an operation for reproducing other multimedia content tied to an item in a set of items is described. Therefore, the multimedia editing apparatus can create final content efficiently while satisfying both regularity and diversification.

DETAILED DESCRIPTION OF THE PREFERRED EMBODIMENTS

Embodiment 1

Figure 1:
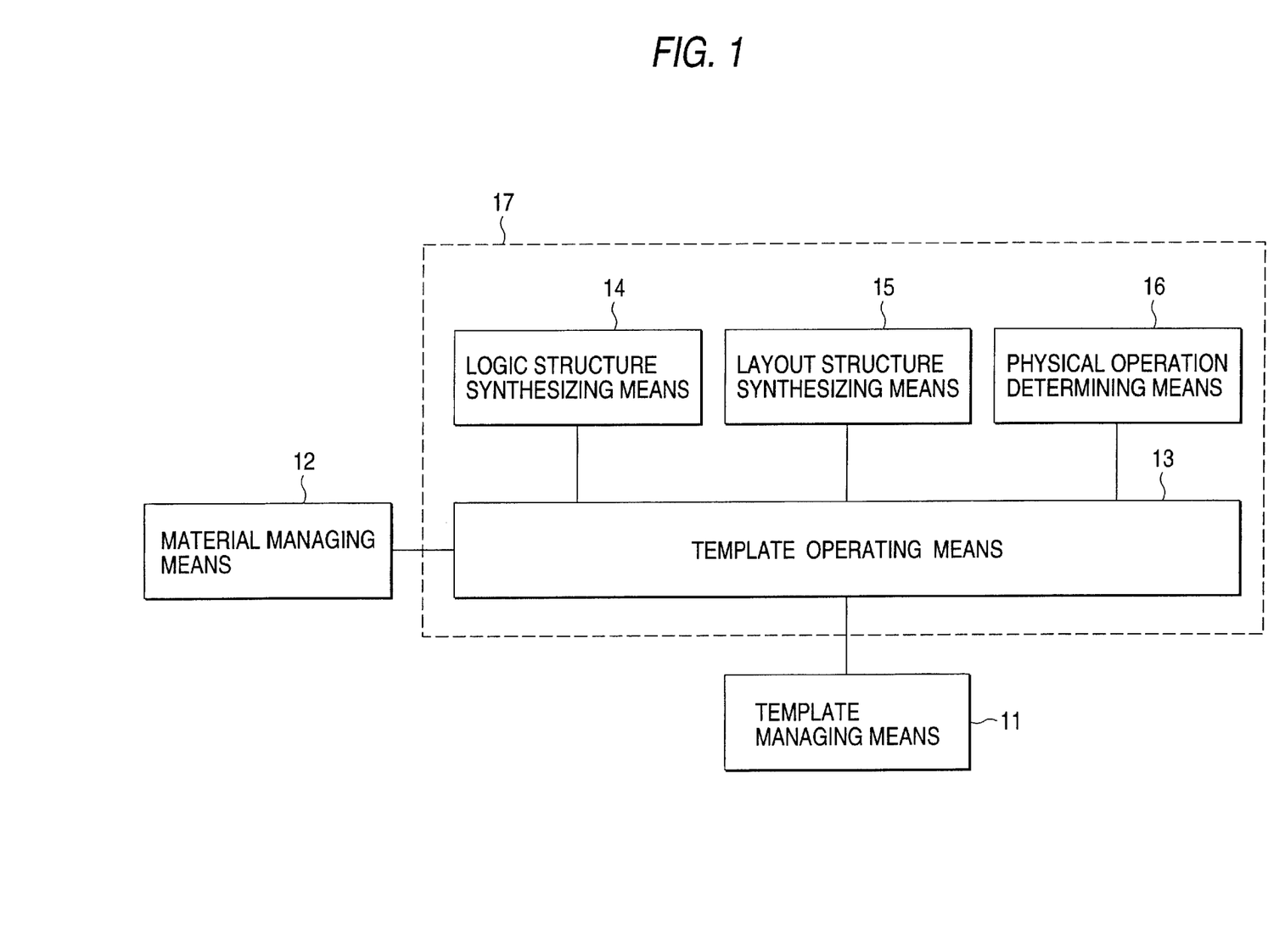
FIG. 1 is a block diagram showing a configuration of a multimedia editing apparatus in a first embodiment of the present invention.

Details of an embodiment of the present invention will now be described. FIG. 1 shows a configuration of a multimedia editing apparatus in a first embodiment of the present invention. In FIG. 1, reference numeral 11 denotes a template managing means that manages a template describing therein a logic structure, a layout structure, and a physical operation common to a diversity of multimedia content; 12, a material managing means that manages material information such as texts, photos, videos; 13, a template operating means that combines material information extracted from the material managing means 12 with a template extracted from the template managing means 11; 14, a logic structure synthesizing means that synthesizes a logic structure in a template with material information; 15, a layout structure synthesizing means that synthesizes a layout structure in a template with material information; 16, a physical operation determining means that determines physical operations of materials based on the synthesized logic structure which material information a physical operation in a template should use; and 17, a content synthesizing means that is formed of the template operating means 13, the logic structure synthesizing means 14, the layout structure synthesizing means 15, and the physical operation determining means 16.

Then, an operation of the embodiment will be described. The template operating means 13 extracts a template stored in the template managing means 11 and combines the extracted template with material information extracted from the material managing means 12. During this combining operation, the logic structure in the template is synthesized with the material information by the logic structure synthesizing means 14; the layout information in the template is synthesized with the material information by the layout structure synthesizing means 15; and which material information the physical operation in the template should use is determined by the physical operation determining means 16. As a result of these operations, specific multimedia content is created.

Then, specific examples in the embodiment will be described. This example attempts to edit a multimedia catalog that has the function of giving explanations of major world cities using material information such as texts, photos, and videos as multimedia content. Specific examples of template content to be prepared in advance and operations during editing will be described.

First, a specific example of a template will be described with reference to FIG. 4. In a template 41, a logic structure 42, a layout structure 43, and a physical operation 44 that are common to multimedia catalogs of major world cities are described. In this example, there are four cities listed in each catalog. Four materials, "city 1", "city 2", "city 3", and "city 4", are included in a "world city guide" as the logic structure 42. As the layout structure 43, a start button and buttons linked with the four cities in the logic structure 42 are arranged on a display screen. When city information has been actually combined, the name of the city combined is displayed on the corresponding city button. As the physical operation 44, two types of operations are described: one operation is linked with the city buttons in the layout structure 43 and reads: "when a city button is pushed, a window is opened and a photo and a description of the corresponding city are displayed"; and the other operation is linked with the start button and reads: "when the start button is pushed, a window is opened and videos of the cities are replayed in the order of city 1, city 2, city 3, and city 4.

In the case where such template 41 is stored in the template managing means 11 of FIG. 1, when the template operating means 13 extracts this template, the layout structure in the template is directly displayed on the display screen. At this moment, the name of the city has not yet been displayed on the city button, and therefore no physical operations will be performed even if the start button and the city button are pressed.

Figure 5:
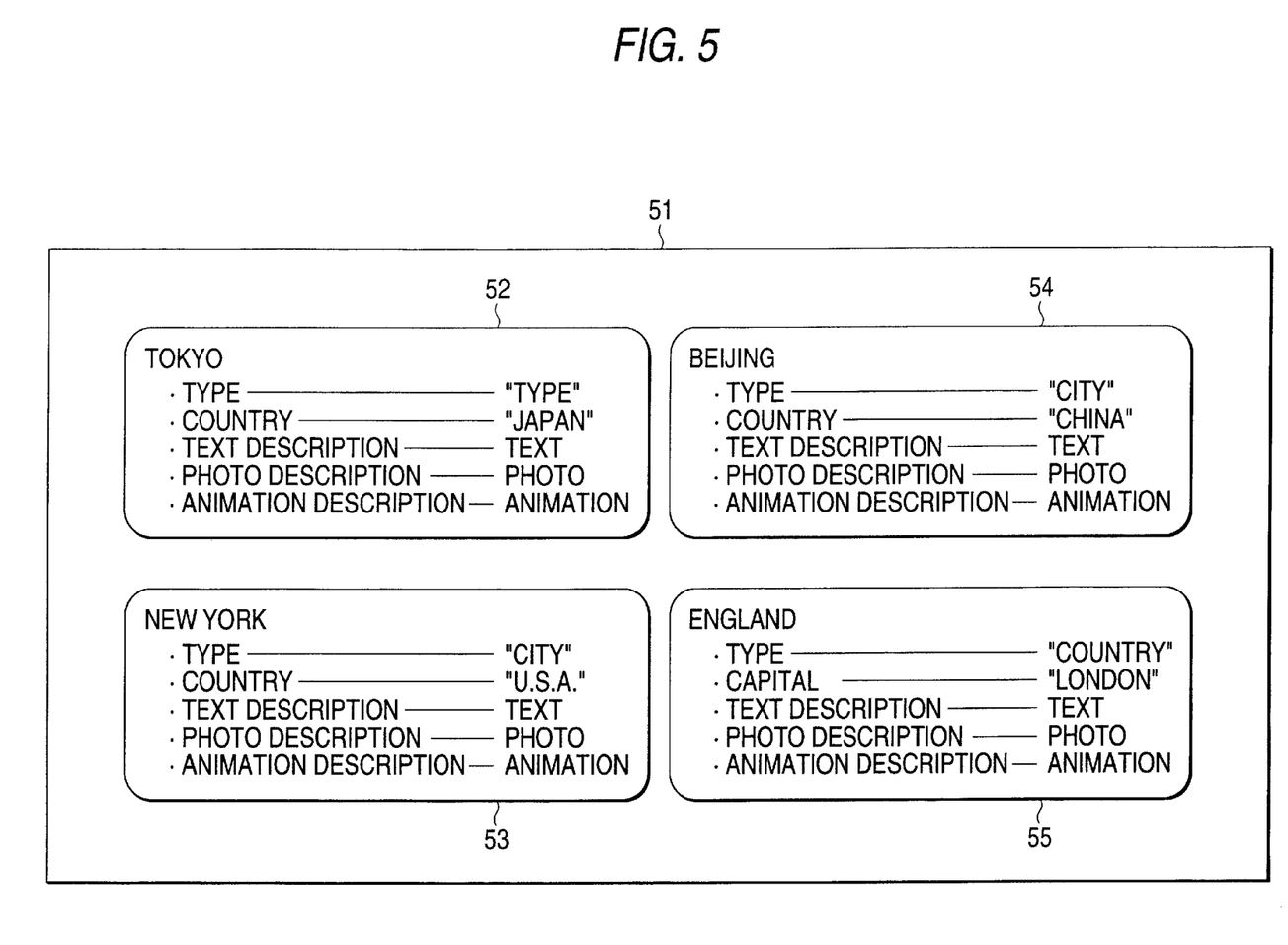
FIG. 5 is an illustration showing a specific example of material information in an embodiment of the present invention.

Then, the template operating means 13 selects four composite materials, e.g., "Tokyo", "New York", "London", and "Paris", from the material managing means 12 as material information to be combined with the template. FIG. 5 shows an example of such material information 51. That is, city information 52 corresponding to "Tokyo", city information 53 corresponding to "New York", city information 54 corresponding to "Beijing", country information 55 corresponding to "England" are present as the composite materials, and a piece of city information includes a country to which the city belongs, a text description, a photo description, and a video description.

Methods of synthesizing a template with material information include: a method of combining material information with a layout structure visually on a display screen; and a method of directly combining material information with a logic structure. The visually combining method may involve the steps of preparing icons for all material information in advance and "dragging and dropping" the icon of selected city information on the corresponding city button. The directly combining method may involve the steps of: preparing a database for world city information in which, e.g., the name of a country is tied with the largest city of such country and automatically selecting, by specifying four countries "Japan", "United States", "England", "France", the four cities "Tokyo", "New York", "London", "Paris" that are the largest cities of the specified countries.

Figure 6:
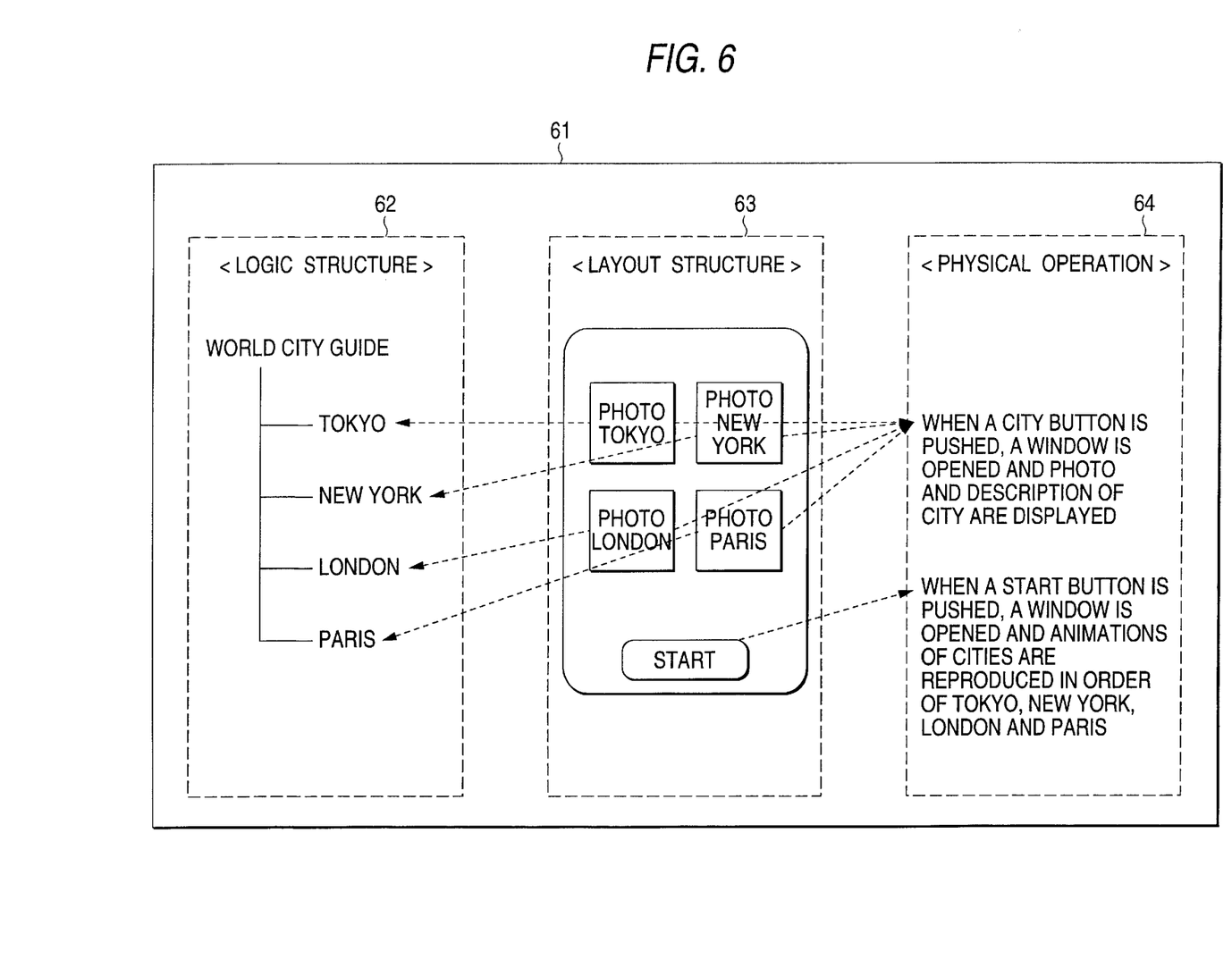
FIG. 6 is an illustration showing a specific example of a combination of a template and material information in an embodiment of the present invention.

FIG. 6 shows an example of a template 61 in which the template 41 is synthesized with the material information 51.

During the synthesizing operation, the logic structure synthesizing means 14 of FIG. 1 prepares a logic structure 62 by inserting the four cities "Tokyo", "New York", "London", "Paris" to the positions of the four cities of the logic structure in the template; the layout structure synthesizing means 15 prepares a layout structure 63 by displaying character strings "Tokyo", "New York", "London", "Paris" to the positions of the four city buttons of the layout structure in the template; and the physical operation determining means 16 prepares a physical operation 64 by determining materials to be actually used during the performance of the physical operation so that when the city buttons are pressed, photos and descriptions of the cities "Tokyo", "New York", "London", "Paris" are displayed or when the start button is pressed, the videos of the cities are replayed in the order of "Tokyo", "New York", "London", "Paris". A final multimedia catalog is thus created.

Second Embodiment

Figure 2:
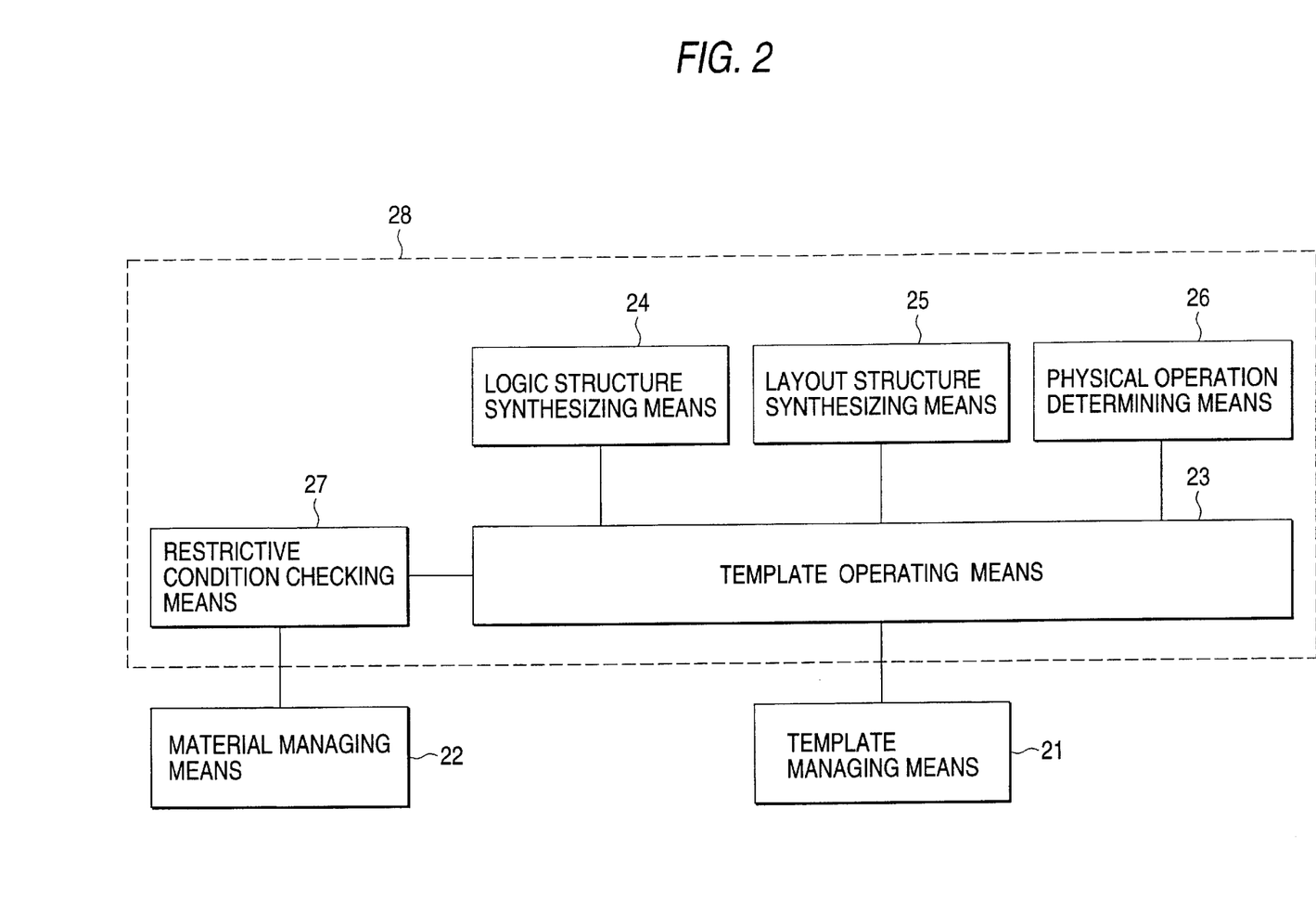
FIG. 2 is a block diagram showing a configuration of a multimedia editing apparatus in a second embodiment of the present invention.

Then, a second embodiment of the present invention will be described. FIG. 2 shows a configuration of a multimedia editing apparatus in the embodiment. In FIG. 2, reference numeral 21 denotes a template managing means that manages a template describing therein a logic structure, a layout structure, and a physical operation common to a diversity of multimedia content; 22, a material managing means that manages material information such as texts, photos, videos; 23, a template operating means that combines material information extracted from the material managing means 22 with a template extracted from the template managing means 21; 24, a logic structure synthesizing means that synthesizes a logic structure in a template with material information; 25, a layout structure synthesizing means that synthesizes a layout structure in a template with material information; 26, a physical operation determining means that determines physical operations of materials based on the synthesized logic structure which material information a physical operation in a template should use; 27, a restrictive condition checking means that checks whether material information extracted from the material managing means 22 satisfies a restrictive condition described in a template and blocks the combining of material information if the material information does not satisfy the restrictive condition; and 28, a content synthesizing means that is formed of the template operating means 23, the logic structure synthesizing means 24, the layout structure synthesizing means 25, the physical operation determining means 26, and the restrictive condition checking means 27.

Then, an operation of the embodiment will be described. The template operation means 23 extracts a template stored in the template managing means 21 and combines the extracted template with material information extracted from the material managing means 22. During this combining operation, the restrictive condition checking means 27 checks whether or not the material information satisfies the restrictive condition described in the template, and only when the material information satisfies the restrictive condition, the logic structure in the template is synthesized with the material information by the logic structure synthesizing means 24; the layout information in the template is synthesized with the material information by the layout structure synthesizing means 25; and which material information the physical operation in the template should use is determined by the physical operation determining means 26. As a result of these operations, specific multimedia content is created.

Figure 4:
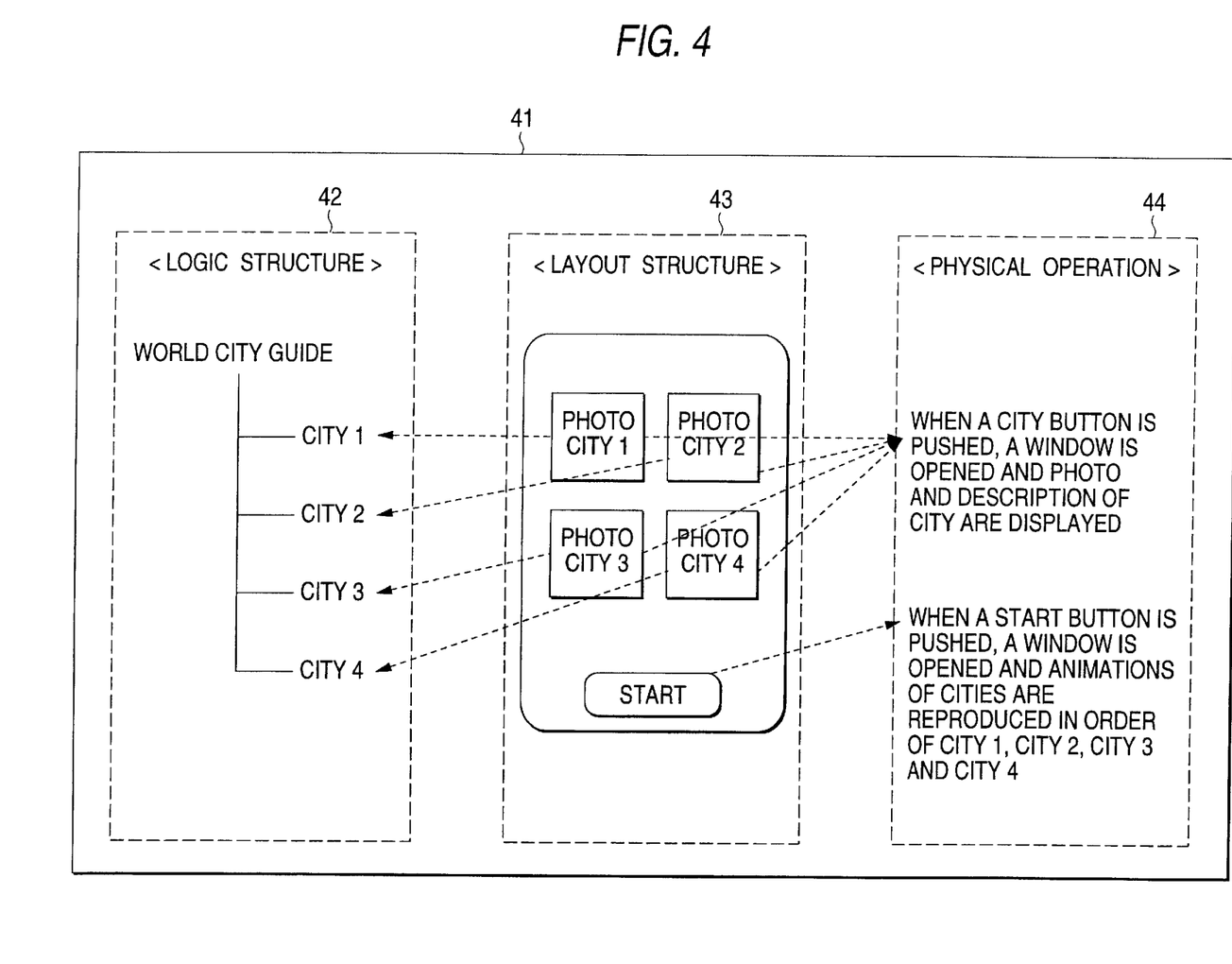
FIG. 4 is an illustration showing a specific example of a template in an embodiment of the present invention.

In the present embodiment, the restrictive condition checking means 27 knows that the material information that can be combined with the template is city information in the specific examples of FIGS. 4 to 6. Therefore, when the template operating means 23 selects material information other than city information, the restrictive condition checking means 27 prevents the selected material information from being combined with the template.

Third Embodiment

Figure 3:
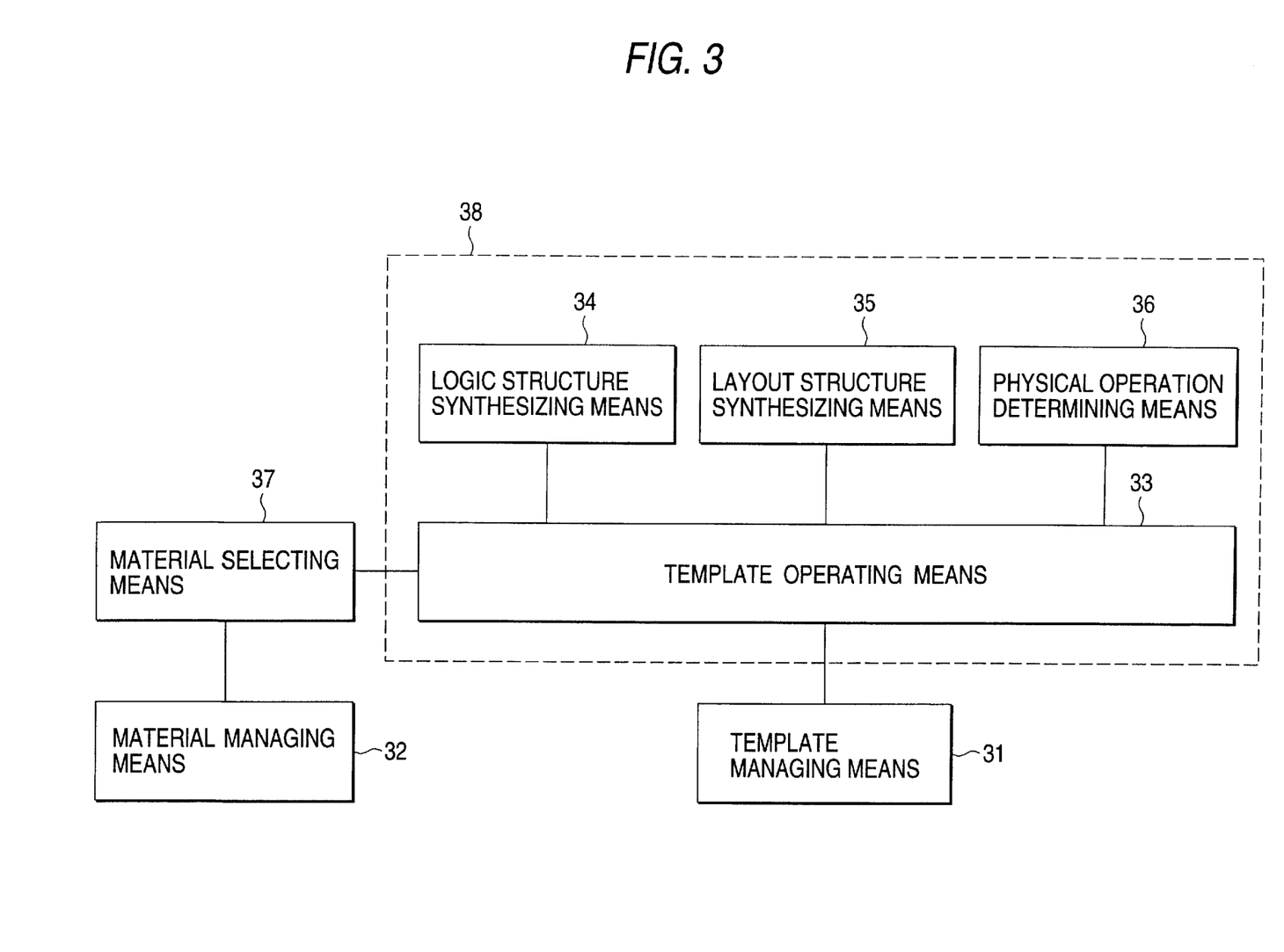
FIG. 3 is a block diagram showing a configuration of a multimedia editing apparatus in a third embodiment of the present invention.

Then, a third embodiment of the present invention will be described. FIG. 3 shows a configuration of a multimedia editing apparatus in the embodiment. In FIG. 3, reference numeral 31 denotes a template managing means that manages a template describing therein a logic structure, a layout structure, and a physical operation common to a diversity of multimedia content; 32, a material managing means that manages material information such as texts, photos, videos; 33, a template operating means that combines material information extracted from the material managing means 32 with a template extracted from the template managing means 31; 34, a logic structure synthesizing means that synthesizes a logic structure in a template with material information; 35, a layout structure synthesizing means that synthesizes a layout structure in a template with material information; 36, a physical operation determining means that determines physical operations of materials based on the synthesized logic structure which material information a physical operation in a template should use; 37, a material selecting means that searches only such material information as to satisfy a restrictive condition described in a template from the material managing means 32 and selects material information to be actually combined with a template from the searched material information; and 38, a content synthesizing means that is formed of the template operation means 33, the logic structure synthesizing means 34, the layout structure synthesizing means 35, the physical operation determining means 36, and the material selecting means 37.

Then, an operation of the embodiment will be described. The template operating means 33 extracts a template stored in the template managing means 31 and combines the extracted template with material information stored in the material managing means 32. During this combining operation, the template operating means 31 first delivers a restrictive condition described in the template to the material selecting means 37, and then the material selecting means 37 searches only such material information as to satisfy the restrictive condition from the material managing means 32, so that material information to be actually combined with the template is selected. It is thereafter that the logic structure in the template is synthesized with the selected material information by the logic structure synthesizing means 34; the layout information in the template is synthesized with the material information by the layout structure synthesizing means 35; and which material information the physical operation in the template should use is determined by the physical operation determining means 36. As a result of these operations, specific multimedia content is created.

In the embodiment, the material selecting means 37 is informed from the template operating means 33 that the material information to be combined with the template is city information in the specific examples of FIGS. 4 to 6. Therefore, the material selecting means 37 searches only city information from material information stored in the material managing means 32, and material information to be actually combined is selected from a set of searched materials by the judgment of an editing operator. Further, if "Tokyo" has already been selected as city information, the material selecting means 37 is informed from the template operating means 33 that the material information to be combined with the template is city information, together with an attribute of "Tokyo" that is "a city in Japan", so that analogous candidates such as "Osaka", "Yokohama", and "Nagoya" are searched from the material information stored in the material managing means 32.

Fourth Embodiment

Then, a fourth embodiment of the present invention will be described. Since the configuration of the apparatus in the present embodiment is the same as those shown in FIGS. 1, 2, and 3, the configurational description thereof will be omitted.

Figure 7:
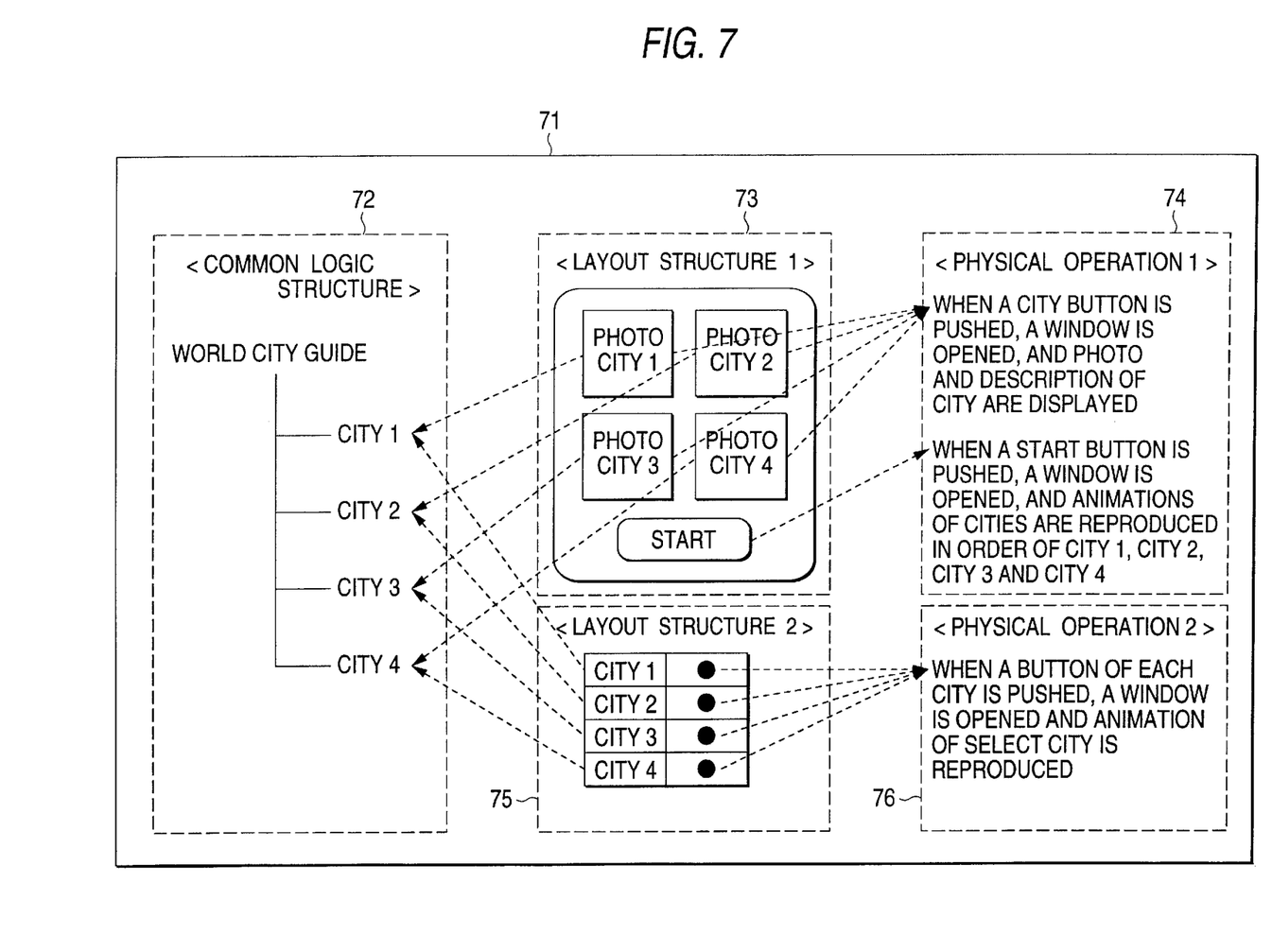
FIG. 7 is an illustration showing a specific example of a diversity of templates, each having the same logic structure, in the fourth embodiment of the present invention.

With a template operating means handling a diversity of templates, a multimedia catalog having a diversity of utilization and display modes can be prepared by using at the same time a diversity of templates, each having a different layout structure and a different physical operation. FIG. 7 shows an example of a composite template 71 in which two of such templates are combined. The two templates have a common logic structure 72, and different layout structures 73, 75 and different physical operations 74, 76. In the first template the layout structure 73 includes four city buttons and a start button, and in the second template the layout structure 75 includes a table of four cities. Even if material information is combined by visually "dragging and dropping" a layout structure on a display screen, a multimedia catalog having two utilization and display modes can be prepared only by performing the combining operation with respect to either one of the layout structures, because the logic structure is shared in common between the templates.

Figure 8:
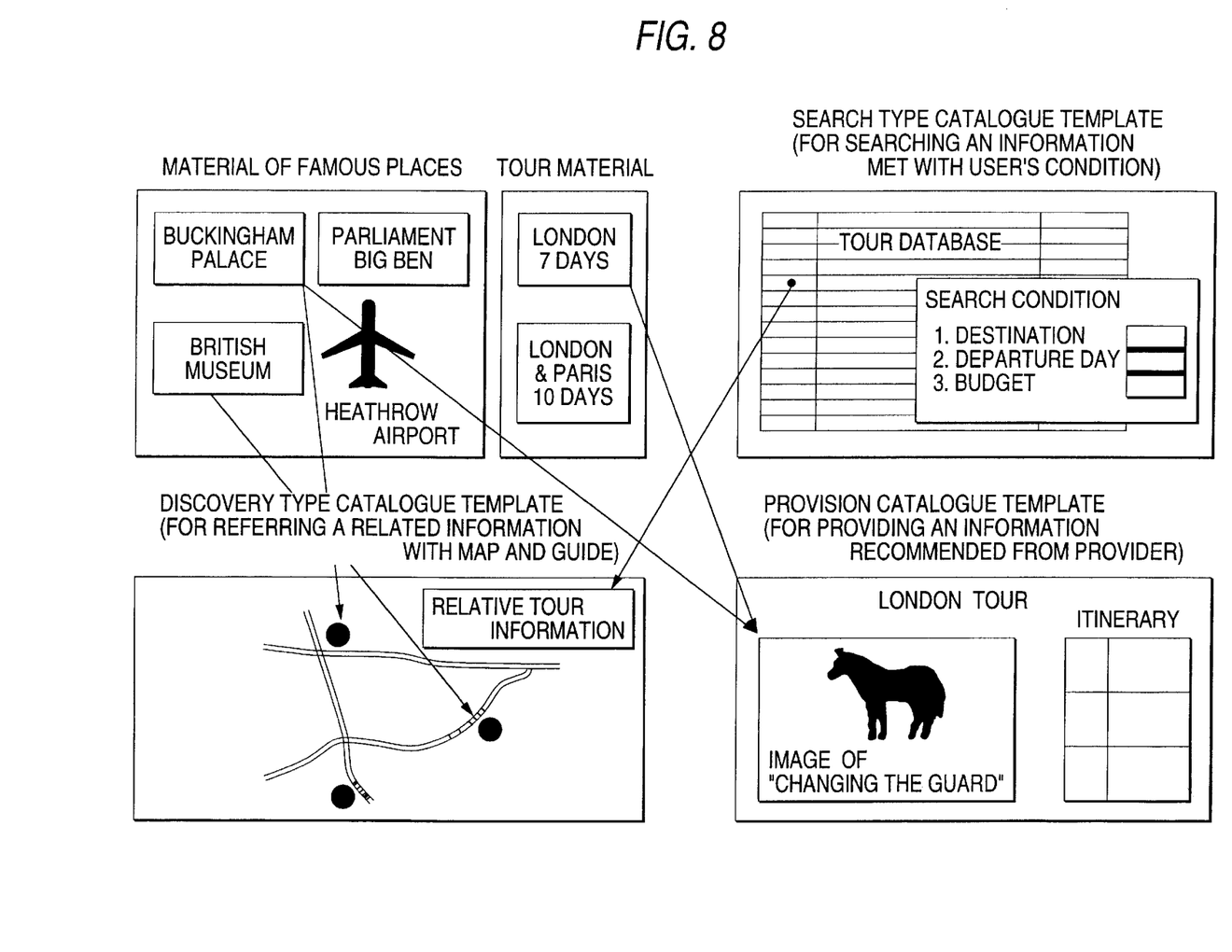
FIG. 8 is an illustration showing specific examples of a searching type template, a presenting type template, and a discovering type template in the fourth embodiment of the present invention.

In preparing multimedia catalogs, the following three types of templates are, among others, available for possible free combinations. A searching type template describes therein the operation of searching an item satisfying a searching condition from a set of items and displaying the searched item. A presenting type template describes therein the operation of interactively reproducing only a specific item. A discovering type template describes therein the operation of reproducing other multimedia content linked to an item in a set of items. An image of the operation of editing these templates is shown in FIG. 8. In FIG. 8, sight materials and tour materials are combined with three types of templates by "drag and drop". In the discovering type template in particular, tour information for visiting sights can be referred to through a map searching system.

As described in the foregoing, according to the present invention, in the case of creating regularity multimedia content such as an electronic catalog or an electronic teaching material, final content can be created efficiently only by combining either visually or logically material information such as texts, photos, and videos while satisfying both regularity and diversification.

Further, according to the present invention, attractive multimedia content having a diversity of display and utilization modes can be created from the same material information with ease by using at the same time a diversity of templates having a common logic structure, different layout structures, and different physical operations.

What is claimed is:

1. A multimedia editing apparatus comprising:
   template managing means for managing a template, said template describing therein a static logic structure, a static layout structure, and a physical operation which is common to a diversity of multimedia content;
   material managing means for managing material information, said material information comprising one or more texts, photos, or videos;

template operating means for combining a template extracted from the template managing means with material information extracted from the material managing means;

logic structure synthesizing means for synthesizing the static logic structure and the material information to provide a specific content logic structure;

layout structure synthesizing means for synthesizing the static layout structure and the material information to provide a specific content layout structure; and physical operation determining means for determining, based on the specific content logic structure, which information of material information the physical operation in the template should use.

2. A multimedia editing apparatus according to claim 1, wherein said layout structure synthesizing means synthesizes a layout of specific content by combining material information with a layout structure in a template visually; and the logic structure synthesizing means synthesizes a logic structure of specific content by combining a logic structure in the template with the material information based on a synthesized layout structure.

3. A multimedia editing apparatus according to claim 1, wherein said logic structure synthesizing means synthesizes a logic structure of specific content by directly combining a logic structure in a template with material information; and the layout structure synthesizing means synthesizes a layout of specific content by combining a layout structure in the template with the material information based on a synthesized logic structure.

4. A multimedia editing apparatus according to any one of claims 1 to 3, further comprising a restrictive condition checking means for checking whether the material information extracted from the material managing means satisfies a restrictive condition described in a template and preventing the information material from being combined when the material information does not satisfy the restrictive condition.

5. A multimedia editing apparatus according to any one of claims 1 to 3, further comprising a material selecting means for searching only such material information as to satisfy a restrictive condition described in a template from the material managing means and selecting material information to be actually combined with the template from searched material information.

6. A multimedia editing apparatus according to claim 5, wherein the material selecting means searches only such information as to satisfy a restrictive condition described in a template and as to have the same attribute as already used material information and selects material information to be actually combined with the template from searched material information.

7. A multimedia editing apparatus according to any one of claims 1 to 3, wherein the template operating means combines a diversity of templates simultaneously with the same material information, the diversity of templates having a common logic structure, different layout structures, and different physical operations such that the logic structure synthesizing means synthesizes the specific content logic structure and the layout structure synthesizing means synthesizes specific content layout structures for each divers template and the physical operation determining means determines physical operations for each diverse template.

8. A multimedia editing apparatus according to claim 7, wherein the multimedia editing apparatus prepares an electronic catalog having a diversity of display modes and utilization modes by combining freely three types of templates, a first template being a searching type template in which a set of items is handled as a logic structure and an operation for searching an item satisfying a search condition from the set of items and displaying the searched item is described, a second template being a presenting type template in which an operation for interactively reproducing only a specific item is described, and a third template being a discovering type template in which an operation for reproducing other multimedia content tied to an item in a set of items is described.

9. A multimedia editing method comprising the steps of:

managing a template and material information, the template describing therein a static logic structure, a static layout structure, and a physical operation which is common to a diversity of multimedia content, the material information comprising one or more texts, photos, or videos;

combining the material information with a template managed in the managing step;

synthesizing, during the combining operation, the material information with the static logic structure in the template and synthesizing the material information with the static layout structure in the template to respectively provide a specific content logic structure and a specific content layout structure; and determining, based on the specific content logic structure, which information of material information a physical operation in the template should use.

10. A multimedia editing method according to claim 4, wherein in the synthesizing step, a layout structure in a template is visually displayed, and material information selected from visually displayed material information is combined with a variable portion of the layout structure, so that a layout of specific content is synthesized; a logic structure in the template is logically tied to the material information based on the synthesized result of the layout structure, so that a logic structure of specific content is synthesized.

11. A multimedia editing method according to claim 9, wherein in the synthesizing step, material information is directly combined with a logic structure in a template, so that a logic structure of specific content is synthesized; and a layout structure in the template is combined with the material information based on the synthesized logic structure, so that a layout of specific content is synthesized.

12. A multimedia editing method according to any one of claims 9 to 11, wherein in the combining step, whether material information selected to be combined with a template satisfies a restrictive condition described in the template is checked; and if the material information does not satisfy the restrictive condition, the material information is prevented from being combined.

13. A multimedia editing method according to any one of claims 9 to 11, wherein in the combining step, only such material information as to satisfy a restrictive condition described in a template is searched; and material information to be actually combined with the template is selected from the searched material information.

14. A multimedia editing method according to claim 13, wherein only such material information as to satisfy a restrictive condition described in a template and as to have the same attribute as already used material information is searched; and material information to be actually combined with the template is selected from the searched material information.

15. A multimedia editing method according to any one of claims 9 to 11, wherein in the combining step, a diversity of templates are combined with the same material information simultaneously, the diversity of templates having a common logic structure, different layout structures, and different physical operations such that the specific content logic structure is synthesized, specific content layout structures for each diverse template is synthesized and physical operations for each diverse template is determined.

16. A multimedia editing method according to claim 15, wherein the multimedia editing method comprises the step of preparing an electronic catalog having a diversity of display modes and utilization modes by combining freely three types of templates, a first template being a searching type template in which a set of items is handled as a logic structure and an operation for searching an item satisfying a search condition from the set of items and displaying the searched item is described, a second template being a presenting type template in which an operation for interactively reproducing only a specific item is described, and a third template being a discovering type template in which an operation for reproducing other multimedia content tied to an item in a set of items is described.

\* \* \* \* \*